Patented Dec. 17, 1946

2,412,708

UNITED STATES PATENT OFFICE 2,412,708

LUBRICATING OILS

Charles M. Blair, Jr., Webster Groves, Mo., assignor to Petrolite Corporation, Ltd., Wilmington, Del., a corporation of Delaware No Drawing. Original application October 16, 1944, Serial No. 558,950. Divided and this application April 20, 1945, Serial No. 589,464

9 Claims. (Cl. 252—51.5)

This application is a division of my pending application Serial No. 558,950, filed October 16, 1944, for new Chemical product and method of manufacturing same, and relates to a new composition of matter comprising a lubricating oil and a new chemical product consisting of polyamides of a resinous or semi-resinous character.

The new chemical products used to produce my new composition of matter, constitute a class of polymerized amides. They may be prepared by reacting two different types of amines, of the kinds hereinafter described, with a polybasic, alpha-beta, unsaturated, carboxylic acid. The two types of amines consist of:

(a) Unsaturated amines, and
(b) Saturated non-aromatic amines.

In my co-pending application Serial No. 558,949, filed October 16, 1944, there are described certain new polymerized amides which are prepared from unsaturated amines and alpha-beta, unsaturated, carboxylic acids in approximately equimolal quantities. The new chemical products herein described may be looked upon as being derived from certain of the compounds disclosed in my said co-pending application Serial No. 558,949. Specifically, they may be looked upon as being the amides of polymerized acid amides derived by condensing a polybasic, alpha-beta, unsaturated acid (or anhydride) with an unsaturated amine, the amine used to form the final amide being a saturated amine.

The new chemical product used to produce the new composition of matter which constitutes my present invention may, perhaps, be best described in terms of a method of preparation. The required reactants are:

(1) A polybasic (including dibasic) alpha-beta, unsaturated, carboxylic acid or anhydride containing no vinyl group;
(2) An unsaturated amine; and
(3) A saturated, non-aromatic amine.

One preferred class of compounds herein contemplated are those prepared from reactants, in which the total moles of (2) and (3) used approximately equal the equivalents of (1) with respect to carboxylic acid groups, while the ratio of moles of (2) to moles of (3) may vary from about 0.2 to 5.0.

The ratio of moles of (1) to moles of (2) used may vary from about 1 to as much as 3 or 4, or possibly more. It appears that 2 moles of alpha-beta, unsaturated acid may, under proper conditions, combine with one mole of mono-unsaturated amine, such as oleylamine, while 3 or 4 or more may combine with a more highly unsaturated amine such as linolenyl amine.

Examples of suitable reactants of class (1) above, are polybasic, alpha-beta, unsaturated, carboxylic acids and anhydrides, such as maleic acid, fumaric acid, citraconic acid, glutaconic acid, aconitic acid, itaconic acid, mesaconic acid, maleic anhydride, citraconic anhydride, itaconic anhydride, and the like. The preferred class of acids and anhydrides are those containing less than 10 carbon atoms, such as the examples just recited. Because of their availability, relatively low cost, and marked reactivity, maleic anhydride, fumaric acid, and citraconic anhydride are especially useful, and products obtained with these reactants will be used below to illustrate the present invention.

Amine reactants of class (2) above, which are suitable for use in preparing the present products, are the unsaturated primary and secondary amines, in which the unsaturation occurs in an aliphatic or cycloaliphatic residue, and in which the ethylenic carbon atom nearest to the amino nitrogen is separated from said nitrogen atom by at least four singly bonded carbon atoms. Such amines may be aliphatic, alicyclic, mixed aliphatic-alicyclic, alkyl-aromatic, alicyclic-aromatic or other containing aliphatic-alicyclic and aromatic residues, and in which the hydrocarbon residues attached to the amino nitrogen contain 8 or more and less than 32 carbon atoms. As stated above, suitable amines must have an ethylenic unsaturation removed by four singly bonded carbon atoms from the amino nitrogen; however, in applying this restriction, aromatic ring carbons are to be considered as singly bonded. Examples of suitable amines include oleylamine, dioleylamine, phenyloleylamine, oleylaniline, p-decenylcyclohexylamine, dihydroabietylamine, p-1-decenylaniline, N-p-decenylcyclohexylaniline, etc. Such amines may contain one or more carbon-to-carbon bonds, but all must satisfy the above requirement as to proximity to the amino nitrogen. When the amine contains two or more double bonds, these may be either conjugated or non-conjugated. My preferred class of unsaturated amines are aliphatic, cycloaliphatic and alkylcycloaliphatic amines having 8 or more carbon atoms and less than 32 carbon atoms in each hydrocarbon residue attached to the amino nitrogen, and are exemplified by the following: 1-amino-octene-5, 1-aminodecene-9, oleylamine, erucylamine, linoleylamine, abietylamine, dihydroabityl amine, n-hexadecyl-n-octadecenyl-amine, dioleylamine, p-1-decenylcyclohexylamine, unsaturated amines obtained as a by-product in the manufacture of primary amines from red oil, commercial mixtures of unsaturated primary amines derived from fatty oils, etc.

Amine reactants of class (3) above, which are suitable for preparing products of the present invention, are the saturated non-aromatic primary and secondary amines containing 8 or more carbon atoms, and less than 37 carbon atoms in each hydrocarbon residue attached to the amino nitrogen. Such amines may be aliphatic-alicyclic, or mixed aliphatic-alicyclic. Examples of suitable amines include decylamine, dodecylamine, p-octylcyclohexylamine, 2-cyclohexylamine, dicyclohexylamine, diamylamine, 2-aminopentane, etc. Amines which are preferred are the normal primary and secondary amines containing 8 or more carbon atoms, and the most preferred amines and the straight chain, primary or secondary aliphatic amines containing 8 or more and less than 22 carbon atoms in each hydrocarbon residue attached to nitrogen.

Examples of preferred amines are: 2-ethyl hexylamine, 5-ethylnonanylamine, 7-ethyl-2-methylundecenylamine, and the like. Examples of the most preferred amines are: n-octylamine, n-decylamine, laurylamine, myristylamine, cetylamine, stearylamine, 1-eicosanylamine, di-octadecylamine, di-laurylamine, commercial saturated primary amines derived from fatty acids, etc.

One method of preparing the present products is to mix the three desired reactants of the kinds described above in the desired proportions, keeping these proportions within the limits previously specified. This mixture is then heated and stirred at a temperature in the range from about 100° C. to about 250° C. for a period of several hours. The exact temperatures and heating periods employed will depend upon the specific reactants employed, as well as upon the use to which the product is to be put. During the heating period the viscosity and average molecular weight of the product increases. For certain purposes, as for use as a pour-point depressant for lubricating oils, a material of average molecular weight in the range of 3,000 to 5,000 may be desirable; so the reaction may be stopped when a sample removed from the reaction mass is found to have this molecular weight. Actually, for control purposes, measurements of viscosity at some standard temperature can be used instead of molecular weight, as these two properties may be correlated for a given combination of reactants reacted under specific conditions.

Although the present compounds may be prepared by reacting at temperatures of from about 100° C. to about 250° C., I generally prefer to carry out the reaction in the temperature range from about 150° C. to about 210° C. The reaction involved is not completely understood, but appears to involve both amide formation and condensation of the unsaturated constituents.

To obtain the highest rate of reaction and polymerization, I have found that certain conditions of reaction are particularly desirable. The discovery of these reaction conditions actually constitutes an invention within an invention, in that it makes possible the preparation of the most desirable products with the minimum of time and effort. In particular, I have found that reaction is promoted by passing through the mixture, during reaction, a slow stream of oxygen or oxygen-containing gas, such as air. The beneficial effect of this operation appears to arise directly from the oxygen in the gas used. When oxygen or an oxygen-containing gas is passed through the reaction mixture, the temperature may be maintained at any point within rather wide limits; but as remarked above, I obtain best results using a temperature of reaction in the range from about 150° C. to about 210° C. With reactants that boil within this temperature range, it is desirable that the materials be reacted under pressure, or that the reaction be conducted for a while at a lower temperature, until amide formation has produced an intermediate of higher boiling point. The temperature may then be gradually increased to a higher value, in order to increase the rate of the reaction. At extremely high temperatures, however, decomposition and oxidation of the product may occur to an objectionable degree.

The time of reaction will depend, of course, upon the reactants themselves, and upon the temperature at which the reaction is carried out, as well as upon the use to which the material is to be put. Ordinarily, this time of reaction will be several hours, and perhaps as much as 48–72 hours. To prepare pour-point depressants, I have found that a typical set of conditions may involve a reaction temperature of about 200° C. and a reaction time of about 24 hours. If the product is to be used as a viscosity index improver, a material of higher molecular weight is required and the reaction in this instance might be continued for as long as 48 hours, or even longer.

Although the new chemical products used to produce my new composition of matter have been described in terms of their preparation from three classes of reactants, it should be pointed out that the reaction may be carried out in a series of steps. The first step might involve reacting only two of the reactants; and this product then may be further reacted with the third material. For example, in preparing a pour-point depressant from reactants such as maleic anhydride, abietylamine, and stearylamine, the maleic anhydride and abietylamine may be condensed first to give a semi-resinous polymer amide of the type disclosed in my co-pending application Serial No. 558,949. This product may then be mixed with stearylamine about equivalent to the free carboxylic acid content of the polymer, and further heated and reacted to complete amide formation. Ordinarily, however, it is more convenient and simpler to combine all of the reactants at once to prepare the desired compound.

The following examples will serve to illustrate how chemical products or compounds of the kind herein described, may be prepared or produced. The parts are by weight:

CHEMICAL PRODUCT

Example 1

183 parts of oleylamine, 87 parts of stearylamine and 56 parts of citraconic anhydride were reacted in a vessel fitted with stirrer, condenser, water trap and heater. The temperature of the reactants was brought to 240° C. and held at that point for 12 hours.

The product was a dark red, viscous oil which had a definite pour-point depressing action on a Coastal lubricating oil.

CHEMICAL PRODUCT
Example 2

65 parts of n-octadecyl-n-octadecenylamine, 65 parts of dioctadecylamine, 33 parts of octadecylamine, 33 parts of octadecenylamine and 28 parts of citraconic anhydride were reacted as in above Example 1.

The product contains some oil-insoluble material. The oil-soluble portion had a pour-point depressant action on a Mid-Continent lubricating oil distillate.

CHEMICAL PRODUCT
Example 3

79 parts of a commercial mixture of oleyl and linoleylamines (iodine No. of 105). 41 parts of octadecylamine, 28 parts of dodecylamine, and 59 parts of maleic anhydride were heated and stirred in a reaction vessel such as that of Example 1, above. The temperature was held for 21 hours at 200° C. while a slow air stream was passed through the reactants. A sample taken at this point was found to have an average molecular weight (cryoscopic in benzene) of 1940. Heating at 200° C. was then continued for a further period of 12 hours. The final product was a clear, stringy, almost rubbery mass with an average molecular weight of 2030. It was clearly soluble in kerosene and lubricating oils.

CHEMICAL PRODUCT
Example 4

40 parts of commercial mixed oleyl and linoleyl amines (iodine No. of 105) and 15 parts of maleic anhydride were heated and stirred under a condenser and water trap for 4 hours at 195° C. 15 additional parts of maleic anhydride were then added and the whole heated at 200° C. under a reflux condenser for 15 hours. A very slow air stream was introduced into the reaction mass during this period. The product at this point was a viscous, rubbery oil. Finally, 156 parts of dioctadecylamine was added and the whole was heated at 200° C. for 30 hours.

The product was a pasty solid, partially soluble in kerosene and SAE 10 lubricating oils.

CHEMICAL PRODUCT
Example 5

41 parts of mono-n-octadecylamine were substituted for the dioctadecylamine in Example 4, above.

It will be noted that in some of the above examples, mixtures of saturated amines have been employed instead of a single species of saturated aliphatic amine. The use of such mixtures is considered the equivalent of using a single species of amine. If desired, mixtures of unsaturated amine may also be employed instead of one unsaturated amine; and the same analogous condition applies to the use of the alpha-beta, unsaturated, polycarboxylic acid.

Although it has been stated that the present compounds are made from a mixture of alpha-beta, unsaturated, polycarboxylic acid and certain saturated aliphatic or cyclo-aliphatic amines, and certain unsaturated aliphatic or cyclo-aliphatic amines, in which the moles of amine are equivalent to the number of carboxylic acid groups present, it is not absolutely necessary that the amino and carboxyl groups be exactly equivalent. In fact, in some instances, it may be desirable to use a small excess of unsaturated acid over that required to react with all of the amino groups. When this is done, the final product may have a small acid number; and for certain uses, a polymeric product with a small acid number is desirable. For example, the residual carboxyls of such reagent may be neutralized with alkalies or amines or heavy metal oxides to yield polymeric salts which have useful properties, in addition to those of the polymers alone. For example, salts such as the sodium salts may be used as sludge dispersers or detergents in lubricating oils. Certain amine salts may be used to inhibit the oxidation of lubricating oils. By the proper balance of carboxyl groups to molecular weight, it is possible to prepare polyfunctional lubricating oil additives, i. e., materials which have more than one function. For example, they may be both pour-point depressants and anti-oxidants. In general, however, it is desirable that the number of residual carboxyls in the polymer product not be sufficient to give the product a neutralization equivalent of less than about 1,000.

The nature of the reaction which results in the formation of the present products is not clearly understood, but it is believed that the alpha-beta, unsaturated, poly-carboxylic acid reacts by amide or imide formation with the amino groups of the amines and also condenses, by proton transfer, with the unsaturated amine at an ethylenic carbon atom of same, or at a carbon atom near the double bond. The unsaturated amine undergoing condensation with a molecule of ethylenic acid is probably linked by amide formation to a different molecule of ethylenic acid; so a type of linear polyamide is formed. The saturated amine employed in the reaction mixture is also acylated by carboxyl groups of the polybasic acid; so the final product is a complicated type of polyamide. When the double bond of the unsaturated amine is nearer to the amino group than allowed by the conditions previously given, good yields of the desired products do not seem to be obtainable. It is believed that this may result from the formation of stable cyclic inner amides, rather than linear polyamides.

It should be pointed out that herein the term "amide" is used in its most general sense to include the acylated amines. The products may be, in some instances, imides or di-acylated amines. Where a primary amine and a dicarboxylic, unsaturated acid, such as maleic acid, are reacted, the products undoubtedly are imides or contain appreciable amounts of imide. Where a mono-carboxylic acid is employed, the products are, in the strictest sense, alkyl or cyclo-alkyl substituted amides. However, the term "amide" will be employed herein and in the claims to include all of these related acylated amine products.

The above postulated reaction may be exemplified by the reaction between oleylamine, stearylamine and maleic anhydride. With these reactants it is believed that the products may be polymerized, substituted succinic acid amides, or possibly, substituted polymerized fumaric acid amides or imides:

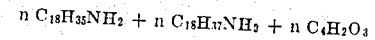

Oleylamine    Stearylamine    Maleic anhydride

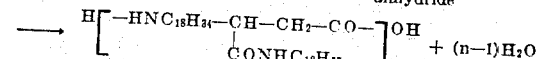

or

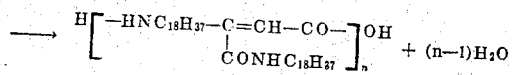

With twice as many moles of maleic anhydride n C₁₈H₃₅NH₂ + n C₁₈H₃₇NH₂ + 2n C₄H₂O₃

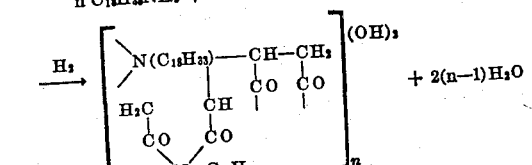
$+ 2(n-1)H_2O$ or

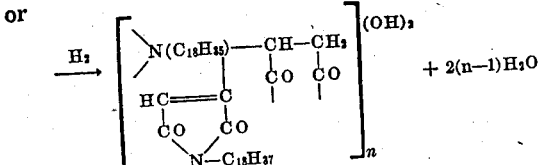
$+ 2(n-1)H_2O$

In the above formulae, no attempt has been made to define the carbon atom of the oleylamine residue, to which the maleic acid residues become attached. Probably, carbon atoms near the double bond, or double-bonded carbon atoms themselves, are involved. It becomes impractical to attempt to show in detail all of the conceivable reactions of the above types which may occur.

The present products will be referred to herein and in the claims as condensation polymers, this term being used in the sense as defined in Gilman "Organic Chemistry," 2d edition, page 702. However, as pointed out above, their formation is believed also to involve addition of one olefinic molecule to another olefinic molecule, thus, in the strictest sense, the resultant compounds may be looked upon as being both condensation and addition polymers.

The new chemical products used to produce my new composition of matter are herein called polymers, but the use of this term is not intended to imply that said products are necessarily of extremely high molecular weight. Some very useful products have average molecular weights no greater than 2,000. The term is intended to imply that the products or compounds contemplated have molecular weights larger than the simple monomeric amides formed by reaction of the ethylenic polycarboxy acid with the amine reactants. As prepared, the crude products, in many instances, undoubtedly contain some monomeric amide as impurity, but such monomer is not contemplated herein, and, in fact, is an objectionable diluent. When the preparation reactions are carried out, as described, the amount of monomer present is usually quite negligible.

Because of the uncertainty as to the mechanism of the reaction, as well as to the large variety of possible reactions which could be postulated, no effort will be made to describe the present products in terms of conventional chemical formula.

My invention consists in using the above chemical products or compounds as lubricating oil additives, particularly for the purpose of lowering the pour-point and increasing the viscosity index of such oils. As specific examples of my present invention, the following examples are given of a new composition of matter, consisting of a mixture of lubricating oil and the new chemical product or compound herein described:

NEW COMPOSITION OF MATTER

Example 1

2% of the product of Example 1, above, was added to a Coastal lubricating oil of SAE 20 grade, having originally a pour-point of 20° F. The mixture was clear and homogeneous and had a pour point of −5° C.

NEW COMPOSITION OF MATTER

Example 2

2% of the product of Example 3, above, was added to a Mid-Continent lubricating oil originally having a viscosity index of 57 and a viscosity at 210° F. of 45.6 S. U. S. The resulting clear oil blend has a viscosity index of 80 and a viscosity at 210° F. of 47.1 S. U. S.

Greater or lesser effects on oil properties than those illustrated may be obtained by adding more or less reagent. In general, the percentages of such products which will be employed vary from as little as 0.025% to 5%, or even more, depending upon the oil with which it is being blended, and upon the use to which the blend is to be put. Thus, one object of my invention is the preparation of such improved lubricating oils or lubricating oil compositions, by adding not less than about 0.025%, or more than about 5% of the herein described compounds to lubricating oils, such as are used in internal combustion engines.

The herein described new chemical products or compounds that form part of my new composition of matter, are, in general, unsaturated, as reaction does not remove all of the olefinic groups of the unsaturated reactants. If desired, these products may be hydrogenated to remove olefinic double bonds. Other chemical reactions may be employed to modify the properties of the polymers. For example, they may be treated with sulfur at elevated temperatures to form sulfurized polymers useful as anti-oxidants and film strength improvers for petroleum or fatty oils.

Previous reference has been made to the fact that one may employ either aliphatic or cyclo-aliphatic amines of the kind described. Although, ordinarily speaking, unsaturated aliphatic amines and unsaturated cyclo-aliphatic amines are not necessarily the obvious equivalent of each other, yet, in light of what has been said above, it is obvious that they are the functional equivalent in the present instance. In the hereto appended claims, reference to an aliphatic amine is intended to include the cycloaliphatic amines. Reference to a straight chain amine must, of course, contemplate only the acyclic type.

Having thus described my invention, what I claim as new and desire to secure by Letters Patent is:

1. A lubricating oil composition, comprising a lubricating oil and an alpha-beta, unsaturated carboxylic acid amine mixture addition-condensation polymer; said polymer being the reaction product of (A) an unsaturated amine containing at least one amino hydrogen atom and at least one ethylenic unsaturation and having at least 4 singly-bonded carbon atoms between the ethylenic double bond and the nearest amino nitrogen atom; and containing less than 32 carbon atoms per nitrogen-attached hydrocarbon group in admixture with a saturated amine containing at least one amino hydrogen atom, free from aryl radicals and containing less than 32 carbon atoms per nitrogen-attached hydrocarbon group; and (B) an alpha-beta, unsaturated, polycarboxylic acid containing less than 10 carbon atoms and free from vinyl radicals; said polymer being mixed with said lubricating oil in an amount within the range of 0.025 to about 5%.

2. The new composition of matter, defined in claim 1, wherein the ratio of total equivalents of (A) to (B) is approximately unity.

3. The new composition of matter, defined in claim 1, wherein the ratio of total equivalents of (A) to (B) is approximately unity, and the ratio of equivalents of unsaturated amine to saturated amine is within the range of 1:5 and 5:1.

4. The new composition of matter, defined in claim 1, wherein the ratio of total equivalents of (A) to (B) is approximately unity, the ratio of equivalents of unsaturated amine to saturated amine is within the range of 1:5 and 5:1; and all radicals attached to amino nitrogen atoms are aliphatic radicals.

5. The new composition of matter, defined in claim 1, wherein the ratio of total equivalents of (A) to (B) is approximately unity, the ratio of equivalents of unsaturated amine to saturated amine is within the range of 1:5 and 5:1; and all radicals attached to amino nitrogen atoms are straight chain aliphatic radicals.

6. The new composition of matter, defined in claim 1, wherein the ratio of total equivalents of (A) to (B) is approximately unity, the ratio of equivalents of unsaturated amine to saturated amine is within the ratio of 1:5 and 5:1; all radicals attached to amino nitrogen atoms are straight chain aliphatic radicals, and the alpha-beta, ethylenic acid is dicarboxy.

7. The new composition of matter, defined in claim 1, wherein the ratio of total equivalents of (A) to (B) is approximately unity, the ratio of equivalents of unsaturated amine to saturated amine is within the range of 1:5 and 5:1; all radicals attached to amino nitrogen atoms are straight chain aliphatic radicals, and the alpha-beta, ethylenic acid is maleic acid.

8. The new composition of matter, defined in claim 1, wherein the ratio of total equivalents of (A) to (B) is approximately unity, the ratio of equivalents of unsaturated amine to saturated amine is within the range of 1:5 and 5:1; all radicals attached to amino nitrogen atoms are straight chain aliphatic radicals, and the alpha-beta, ethylenic acid is fumaric acid.

9. The new composition of matter, defined in claim 1, wherein the ratio of total equivalents of (A) to (B) is approximately unity, the ratio of equivalents of unsaturated amine to saturated amine is within the range of 1:5 and 5:1; all radicals attached to amino nitrogen atoms are straight chain aliphatic radicals, and the alpha-beta, ethylenic acid is citraconic acid.

CHARLES M. BLAIR, Jr.